United States Patent [19]

Hollyfield, Jr. et al.

[11] Patent Number: 5,301,797
[45] Date of Patent: Apr. 12, 1994

[54] TORQUE ARM SYSTEM FOR CONVEYOR BELT CLEANERS

[75] Inventors: Clifford G. Hollyfield, Jr., Roswell; Allen S. Jackson, Atlanta, both of Ga.

[73] Assignee: J & H Equipment, Roswell, Ga.

[21] Appl. No.: 11,282

[22] Filed: Jan. 29, 1993

[51] Int. Cl.⁵ .......................................... B65G 45/00
[52] U.S. Cl. ................................................ 198/499
[58] Field of Search ............... 198/497, 499; 15/256.5, 15/256.51, 256.6

[56] References Cited

U.S. PATENT DOCUMENTS

| | | | |
|---|---|---|---|
| 4,598,823 | 7/1986 | Swinderman | 198/499 |
| 4,854,443 | 8/1989 | Gordon | 198/499 |
| 4,925,434 | 5/1990 | Swinderman et al. | 198/499 |
| 4,995,851 | 2/1991 | Taylor et al. | 198/499 |
| 5,016,746 | 5/1991 | Gibbs | 198/499 |
| 5,201,402 | 4/1993 | Mott | 198/499 |

Primary Examiner—Joseph E. Valenza
Attorney, Agent, or Firm—Stephen D. Carver; J. L. Mahurin

[57] ABSTRACT

A conveyor belt cleaner system comprising a plurality of scrapers for contacting and cleaning a conveyor belt includes an adjustable, internal torsion assembly that avoids external springs. A scraper assembly comprises an elongated, generally tubular torque arm of square cross section having an integral, upwardly projecting flange that mounts the scrapers. The torque arm is mounted for rotation radially toward or away from the conveyor belt between suitable brackets. Internal Z-shaped torsion springs extend generally from the brackets to the torque arm interior. The springs yieldably bias the scraper assembly against the conveyor belt. One leg of the Z-shaped springs is torsionally locked within the torque arm between opposed corners, and the opposite end terminates in a drive key projecting from the brackets. Preferably a ratchet system is employed to lock the torque arm in a desired tension. A variety of different scraper blade shapes and configurations can be used. Primary cleaners are preferably formed of urethane. In one embodiment, trunnions extending from the brackets over the spring legs are coaxially, telescopingly received within the torque arm.

17 Claims, 7 Drawing Sheets

TORQUE ARM SYSTEM FOR CONVEYOR BELT CLEANERS

BACKGROUND OF THE INVENTION

The present invention broadly relates to conveyor belt scrapers or cleaners. More particularly, our invention relates to mechanical biasing systems for conveyor belt cleaners.

As is well known in the art, materials handled by conveyor belts often tend to stick to the belt surface. Numerous conveyor belt cleaner systems have been proposed for cleaning purposes. Systems that hold a series of teeth or blades against a conveyor belt surface to scrape off material adhering to the belt have been present in the industry for years. Such systems have removable blades and adjustment systems for varying the position of the blades relative to the conveyor belt. Such a system is disclosed, for example, in U.S. Pat. No. 4,953,689.

Cleaning blades or scraping structures must normally be mechanically biased against the belt surface to be cleaned for maximum efficiency. Such a system is disclosed in Swinderman U.S. Pat. No. 4,944,386. This patent discloses a weighted, generally V-shaped blade that is tethered to a frame encompassing a conveyor belt. The downward pressure of the scraper is increased by the addition of ballast to a housing disposed on the scraper. Lenbek, U.S. Pat. No. 4,586,600, relates to a torsioning arrangement for a belt cleaner which employs a camming feature to hold the scrapers in the cleaning position against the belt. Stahura U.S. Pat. No. 4,098,394 discloses a mounting support arrangement for a conveyor belt cleaner which employs a ratchet system to keep the scrapers biased against the belt and a locking dog to secure the shaft containing the blades against counter rotation.

Swinderman U.S. Pat. No. 4,925,434 discloses a torsional tension device for imparting torsional bias to the shaft containing the cleaning blades while simultaneously providing a shock absorbing mechanism. This is accomplished by a series of hubs and a torsion coupling of elastomeric material connecting the two hubs together. Bushings of elastomeric material provide the shock absorbing feature of the Swinderman patent, while set screws lock the shaft in a position imparting tension through the blades against the belt.

Other devices for biasing blades against a conveyor belt are disclosed in Gordon, U.S. Pat. Nos. 4,202,437; 4,231,471 and 4,533,036. The first of these patents discloses a conveyor belt scraper assembly having three sets of blades disposed on a rotating housing. Each set of blades slides in a channel on the housing. This allows the blades not currently in contact with the belt to be replaced. The second of the Gordon patents discloses a conveyor belt apron assembly employing "U" shaped brackets. Each bracket being individually biased toward the conveyor belt and each bracket holding a scraper. The tension of this bracket assembly is adjusted by a wedge extending into the side walls of the bracket. The third Gordon patent discloses a plurality of elastomer blades mounted on a shaft. All or some of the blades having a resilient resin torsion member biasing each blade toward the conveyor belt.

All the above patents to one degree or another lack features desirous in a conveyor belt cleaning system. Desirable features include ease of adjustment, compactness of design, shock absorbency, and ease of installation. Known devices use cumbersome and unreliable external torsion spring systems that detract from efficiency.

SUMMARY OF THE INVENTION

We have designed a conveyor belt cleaner system that is reliably biased into conveyor belt contact by concealed, internal springs. The apparatus may be conveniently installed and adjusted by a single individual employing common hand tools. The internal arrangement of all the tensioning components of the present system prevents workplace hazards. All the elements of the present system are confined behind a door that projects only a minimal distance out into the work area surrounding the conveyor belt.

The present invention has the ability to be yieldably tensioned against the conveyor belt. Concurrently it possesses the ability to deflect away from the belt and return to the belt with its original tension intact. In other words, once the present system si adjusted to a desired tension, the torsion assembly maintains that tension while allowing the scrapers to "kick back." Ease of installation of the present system is facilitated by adjustable brackets and design compactness. Furthermore the present invention is of a self- contained or modular nature, further facilitating installation by one or two workers.

The present cleaner system generally comprises a plurality of cleaning scrapers intended to contact and clean a conveyor belt. These scrapers are mounted on a transverse frame. The frame includes end brackets and a torsion assembly braced by suitable housings and a cylindrical trunnion.

A variety of different blade shapes and configurations can be advantageously employed. An individual primary cleaning scraper is preferable formed of urethane. The scraper is bolted to an upwardly projecting flange that is affixed to the exterior surface of the square-profiled torque arm.

Two types of secondary cleaners may be attached to the frame by a channel adapted to receive the bases of the individual secondary cleaners. Individual secondary cleaners are comprised of a scraper secured on a rod extending from the base. A pair of grooves is cut into the base to allow insertion of the individual cleaner into the frame channel. One type of secondary cleaner uses upright, metal blades that can be easily adjusted. These blades adjust relative to their base through selective positioning of an adjacent sleeve. The other type of secondary cleaner uses a primary scraper disposed upon the rod along with a spacer The torsion assembly is generally located between the outer brackets. Preferably the assembly comprises one or more Z-shaped springs that extend into a torque arm that mounts the scrapers. The torque arm preferably has a square cross section. Tension adjustment means are also provided. A key extends from a drive head into engagement with the spring leg. The has at least one hole drilled through it to accommodate the shorter leg of the Z-shaped spring. The square key and the end of the Z-shaped spring may be housed within a trunnion inserted into the square torque arm. The longer leg of the Z-shaped torsion spring is indexed between diametrically opposed interior corners of the torque arm. Brackets disposed at the outer ends of the system mount it to framework associated with the conveyor. Tension adjustment means are provided to vary the spring bias, and thus the force of the arm against the conveyor. The tension adjustment may be accomplished by a ratchet that is mechanically linked to the springs to rotate same, or by a key linkage that passes through an adjustable bracket cap to a spring leg within the torque arm.

The longer leg of the Z-shaped spring is of sufficient length to reach from one corner of the square arm to the diametrically opposed corner. Therefore, it is too long to turn within the torque arm. Preferably the mating collar is disposed on the trunnion and abuts the edge of the torque arm. The assembly is adjusted by loosening the retaining bolt in the end bracket and turning the square key. Once the desired tension is obtained, the retaining bolt is tightened, thereby locking the device with the desired tension.

Thus an important object of our invention is to torsionally bias scrapers or cleaning blades against a conveyor belt while concurrently allowing them to spring away from the belt if severe resistance is encountered.

Another important object of our invention is to provide an internal torsion bar system that allows a wide range of tension to be asserted by the cleaning scrapers.

Yet another primary object of the present invention is to disclose a conveyor belt cleaning system that allows the scraper to flex with belt movement, while maintaining positive contact with the belt.

Another object is to present a belt cleaning system that is compact and does not extend beyond the sides of the conveyor belt itself more than necessary.

A related object of this belt cleaning system is to provide a totally enclosed system.

A further object is to tension a belt cleaner from only one side of the assembly.

A related object is to provide a means to tension a belt cleaner from one side of the assembly for belts less than seventy-two inches in width.

Yet another object of the present invention is to improve safety in the work place by reducing the number of elements protruding from a conveyor belt system.

A further object of the present invention is to provide a tensioning system adapted to use existing components such as scrapers or outer frames.

Another object of the present belt cleaning system is to provide a belt cleaner that allows one person to make tension adjustments.

Another object of the present invention is to provide a belt cleaner biasing system of the character described that can be serviced quickly and easily. It is a feature of the invention that it can be quickly removed so that new blades can be installed, and all parts can be accessed, inspected, and reinstalled in a matter of minutes.

Yet another object of the present invention is to provide a system that can be used in tandem to provide maximum cleaning for applications where it is required.

A related object of the present invention is to reduce spillage and carry over of a conveyor belt where multiple belt cleaning systems are used.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and in which like reference numerals have been employed throughout to indicate like parts in the various views.

DETAILED DESCRIPTION

Figure 1:
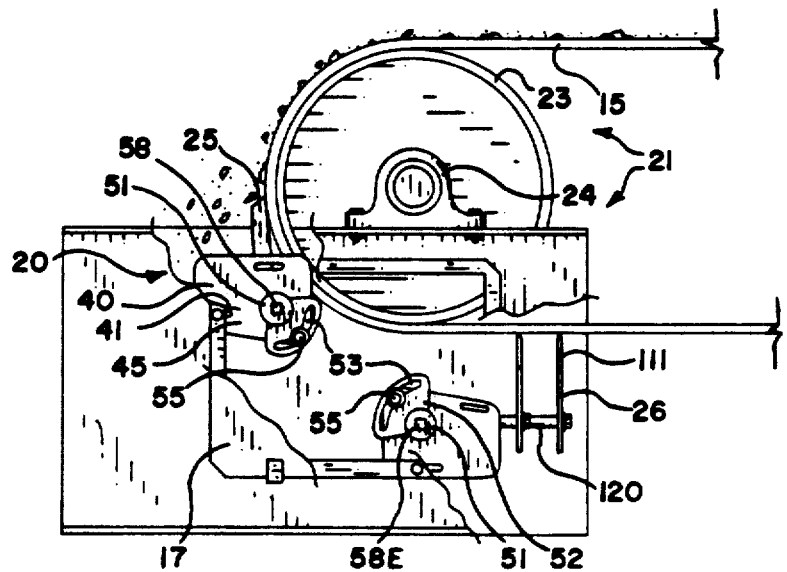
FIG. 1 is a fragmentary, side elevational view of a typical conveyor belt system on which our invention has been mounted.
Figure 2:
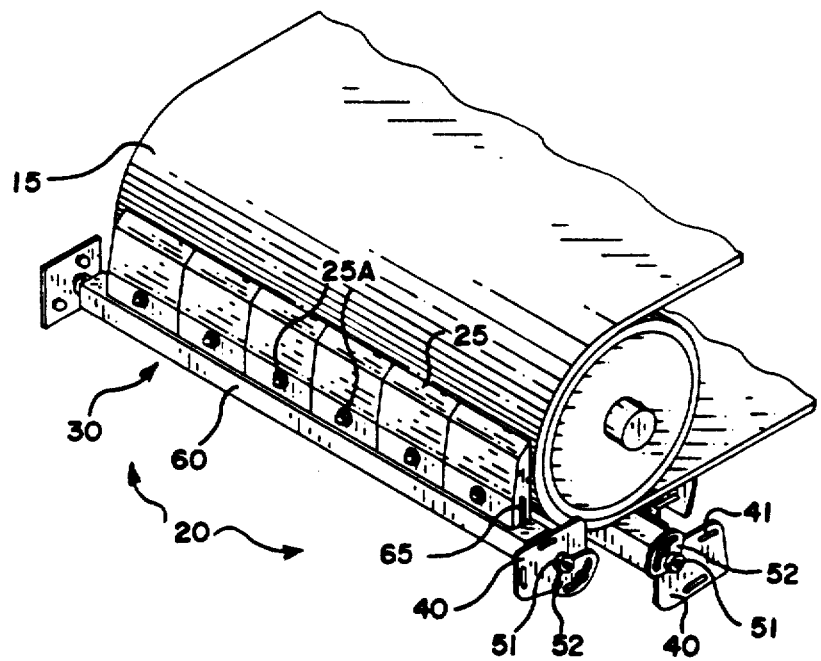
FIG. 2 is an enlarged, fragmentary isometric view of the primary cleaner system with portions of the conveyor belt assembly omitted for clarity.

With initial reference directed now to FIGS. 1–8 of the accompanying drawings, the best mode of our Torque Arm Conveyor Belt Cleaner System has been broadly designated by the reference numeral 20. System 20 is adapted to be employed upon a conventional conveyor 21, which of course may be of different sizes or configurations. Conventional belt 15 is entrained about rotatable drum 23 that is captivated between opposing pillow blocks 24. The cleaner system generally comprises a group of scrapers 25 that frictionally contact conveyor belt 15. Scrapers 25 are mounted on a generally transverse frame 30. The frame 30 includes end brackets 40 and a torsion assembly 50 (FIGS. 5, 6) projecting within opposite ends of the rigid, tubular arm 60 forming the base of frame 30. A door 17 covers the aforementioned components to isolate them from workspaces adjacent the conveyor belt 15. Frame 30 is yieldably, torsionally biased toward drum 23 to insure scraper contact with the conveyor belt as described hereinafter.

Figure 3:
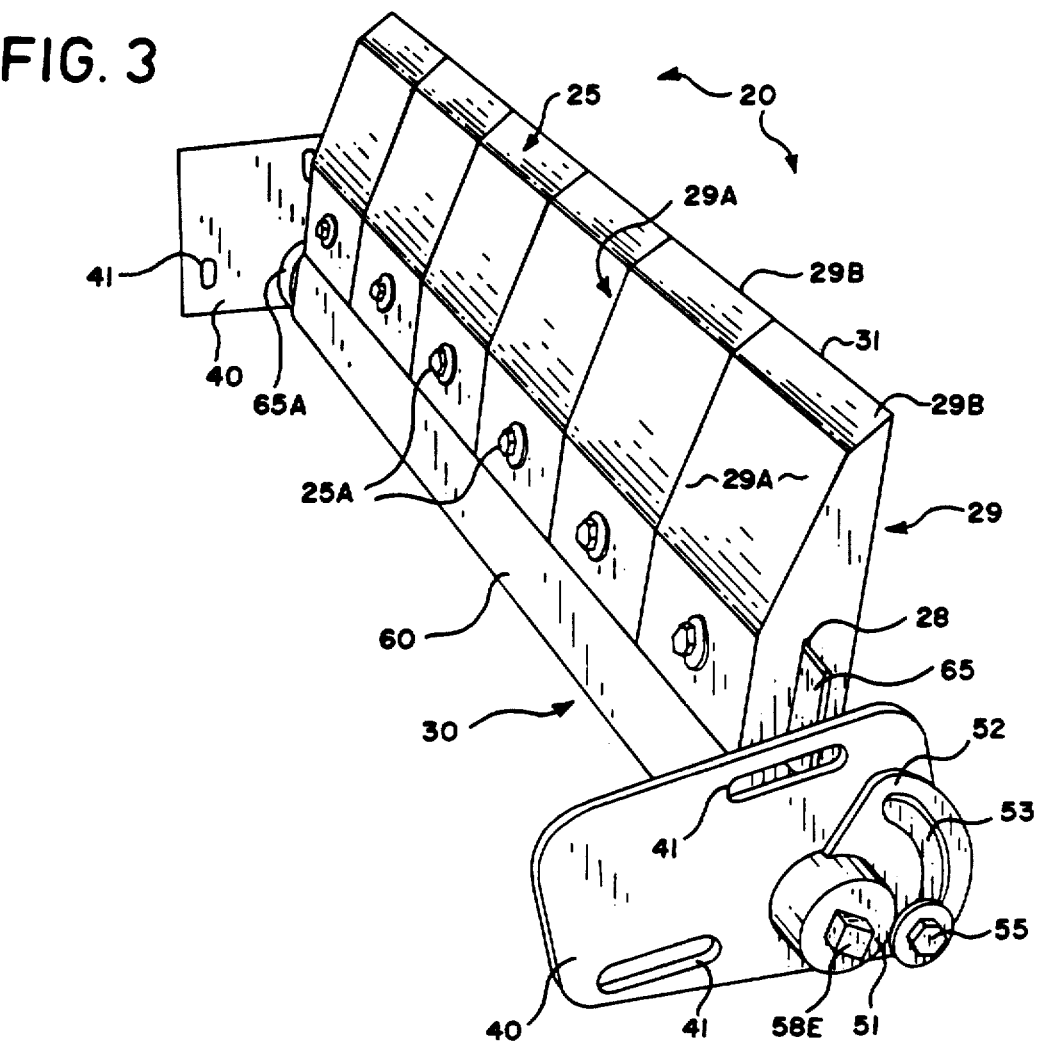
FIG. 3 is an isometric view of a typical primary cleaner assembly.
Figure 4:
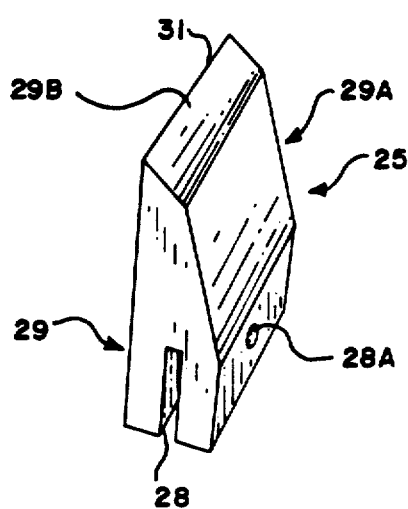
FIG. 4 is an isometric view of a preferred primary cleaner scraper.
Figure 5:
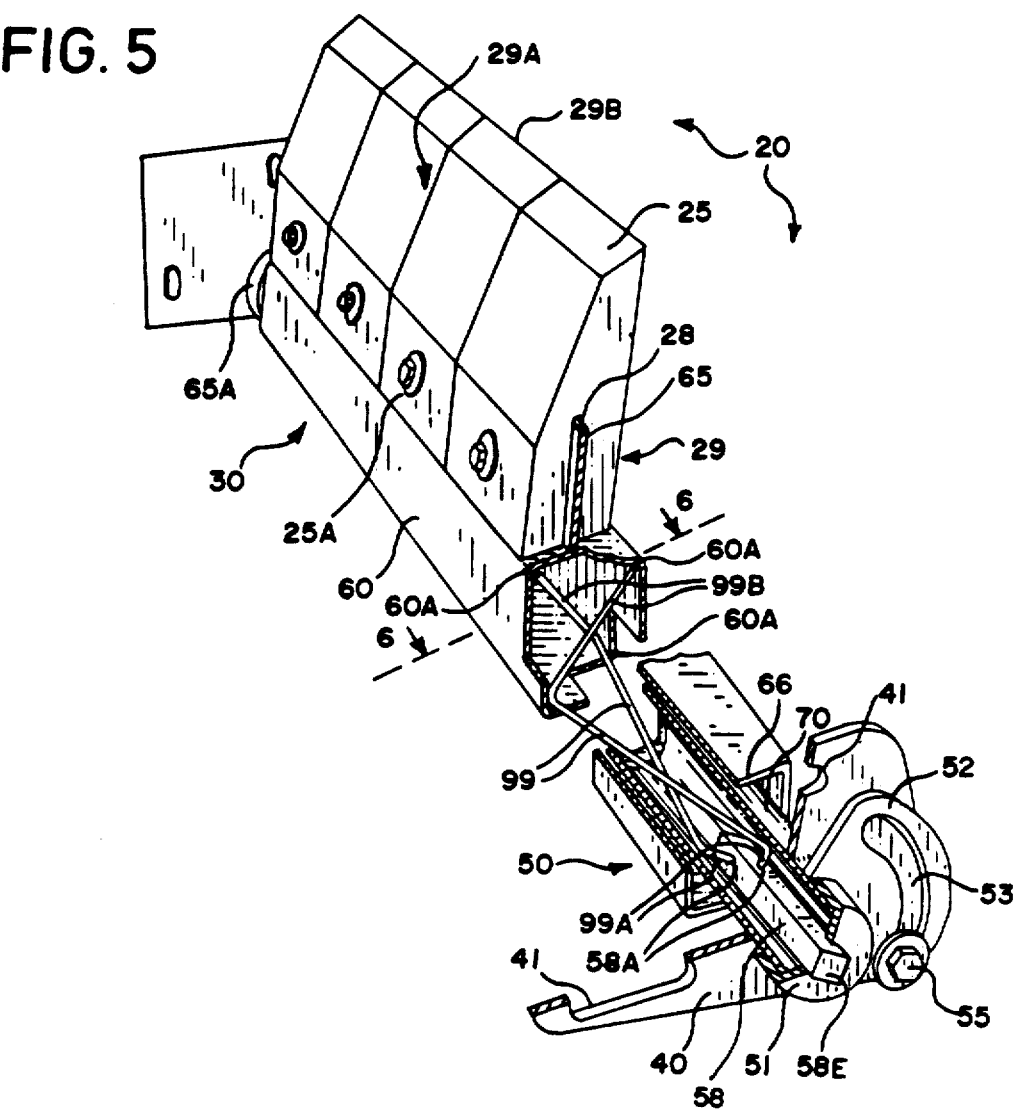
FIG. 5 is a fragmentary, isometric view of the preferred primary cleaner system illustrating the critical internal torsion springs.
Figure 6:
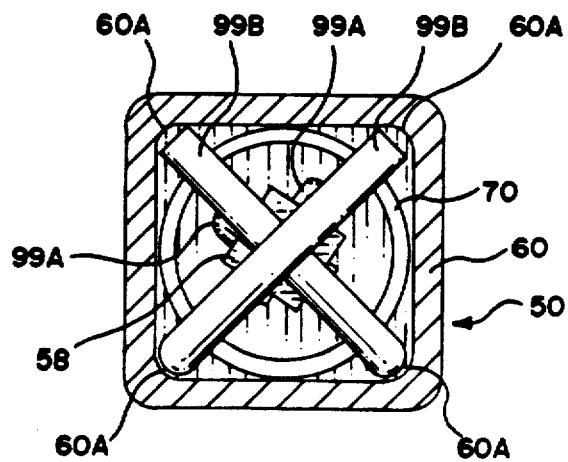
FIG. 6 is a fragmentary sectional view taken generally along line 6—6 of FIG. 5, with portions thereof omitted for brevity.

A variety of different scraper shapes and configurations can be used with the present invention. A preferred primary cleaning scraper 25 illustrated in FIG. 4 is formed of urethane. Each scraper 25 has a lower mounting slot 28 formed in its generally parallelepiped body 29 that is penetrated by a perpendicular orifice 28A. As best illustrated in FIGS. 3 and 4, scrapers 25 are secured by a bolt 25A to an upwardly projecting flange 65 that is affixed to the exterior dorsal surface of frame housing 60. Orifices 28A receive elongated mounting bolts 25A. A generally wedge-shaped body portion 29A terminates in an inclined, leading bladeshaped lip 29B. Lip 29B terminates in an outermost leading edge 31 urged into contact with the conveyor belt 15.

Figure 7:
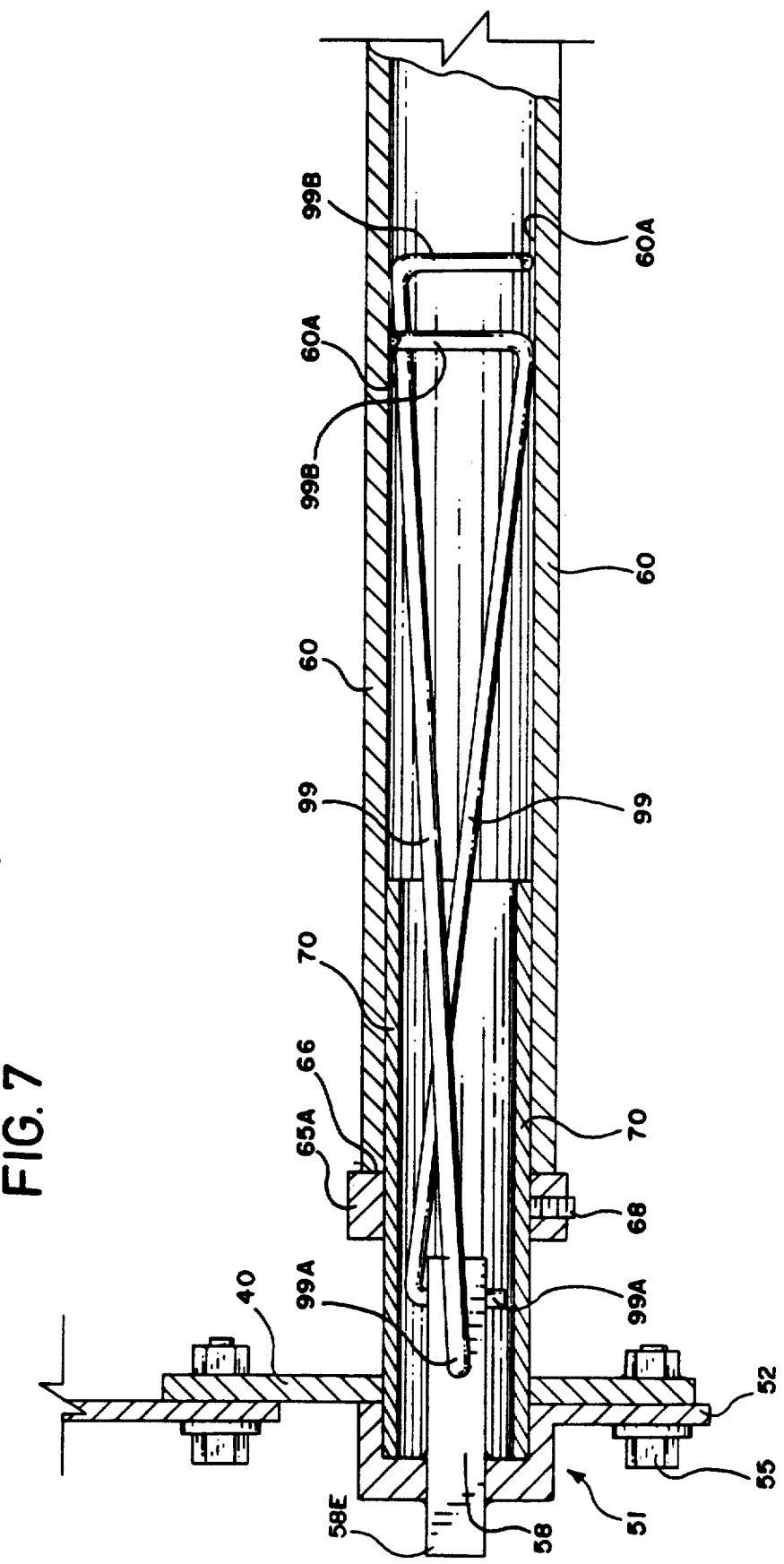
FIG. 7 is an enlarged, fragmentary longitudinal sectional view of the preferred primary torque arm system illustrating the relative positions of the torsion springs, with portions thereof broken away or omitted for clarity.

Generally rectangular outer brackets 40 mount the conveyor belt cleaner 20 to suitable external frame portions of the conveyor 21. The brackets facilitate a variety of conveyor belt equipment configurations with upper and lower elongated mounting slots 41. Frame 30 extends generally transversely across conveyor 21, terminating short of abutment with brackets 40 (FIG. 7). Frame 30 is rotatably mounted relative to brackets 40 by the torsion assembly 50.

The torsion assembly 50, best illustrated in FIGS. 5-8, functionally interconnects the frame 30 with the outer brackets 40. The purpose of the tension assembly is to bias the selected scrapers or blades toward the conveyor. Torsion assembly 50 primarily comprises one or more torsion springs 99 that are anchored at one end to bracket 40 and at an opposite end within the torque arm 60. As best viewed in FIG. 7, for example, each torsion spring 99 has a generally Z-shaped side profile. Torque arm 60 has a polygonal cross section, and it is preferably of a square cross section. Torque arm 60 is preferably formed of square steel tubing and it is this tubing to which the scrapers 25 are secured.

With joint reference to FIGS. 5-8, an internal anchoring key 58 of square cross section receives terminal spring legs 99A. Key 58 has at least one hole 58A drilled through it to accommodate legs 99A of the "Z" shaped torsion springs 99. The leg 99A of spring 99 that passes through the hole 58A in the square key 58 is shorter than the opposite spring leg 99B. Key 58 (and thus the legs of the "Z" shaped springs 99) coaxially penetrates a tubular trunnion 70. Trunnion 70 is generally formed of schedule forty steel pipe, and it extends towards and into torque arm 60 from bracket 40. A mating collar 65A is coaxially disposed about and secured to trunnion 70 by set screws 68. The trunnion 70 is received within arm 60 in contact with its interior walls. The longer leg 99B of the "Z" shaped spring 99 is indexed to an interior corner 60A of the arm 60, and leg 99B is of sufficient length to reach from one internal corner 60A of the torque arm to the diametrically opposed internal corner. Therefore, the spring leg torsionally locks the spring within arm 60. The mating collar 65A is adjusted to face against the edge 66 of the square arm 60 to somewhat seal the interior of the torque arm 60.

Figure 8:
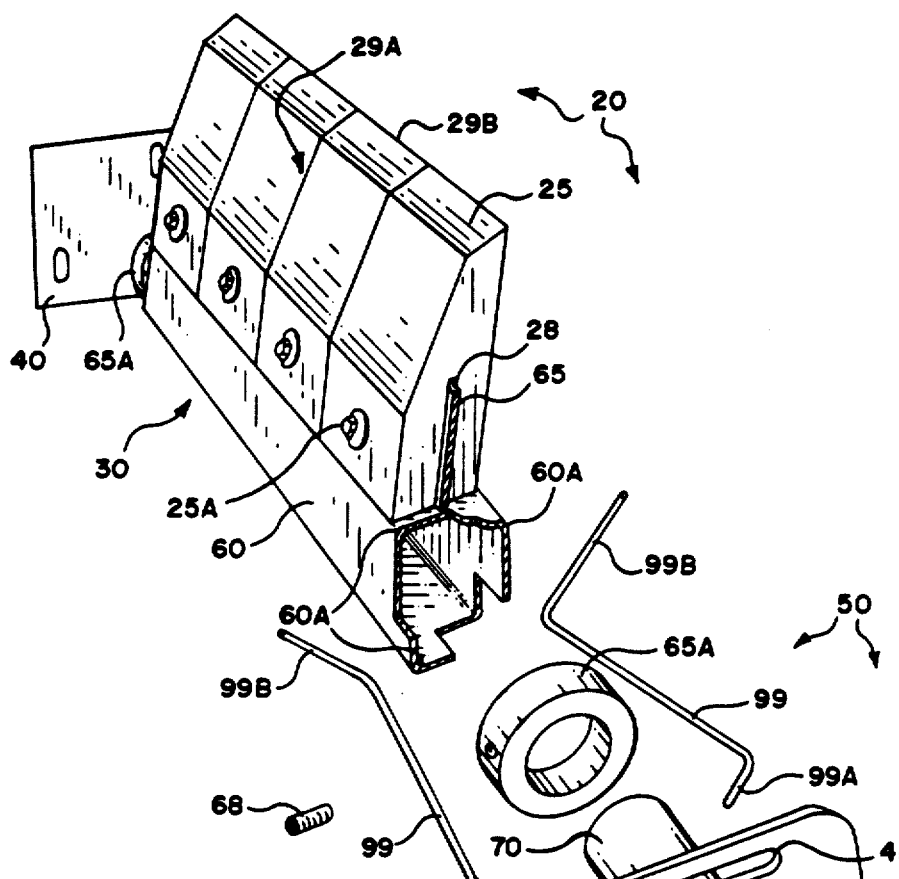
FIG. 8 is an enlarged, fragmentary exploded perspective view of the preferred torque arm system.

Brackets 40 provide an anchor point for a tension adjustment system 54 (FIG. 8). A tensioner cap 51 is revolvably coupled to the bracket 40. Trunnion 70 coaxially penetrates the interior of cap 51. Key 58 passes through the trunnion and is locked to the cap 51. Key drive head 58E may be twisted by a suitable wrench. Cap 51 has an outwardly projecting flange 52 that has a curved follower slot 53 formed in it. Follower slot 53 indexes with an adjustment bolt 55 secured through a threaded hole 56 in the bracket 40. Key 58 passes from the interior of the torsion assembly 50 through this cap 51, forming part of the tension adjustment assembly. Thus when bolt 55 is loose, the brackets 40 may be rotated to rotate torque arm 60 torsionally toward or away from the conveyor belt 15. When the scrapers contact the belt, they may be urged into frictional contact against yieldable bias from the torsion springs 99 disposed within the torsion assembly 50. Bolts 55 may thereafter be secured, once the desired spring bias results to forcibly urge the scrapers towards the belt.

Figure 8A:
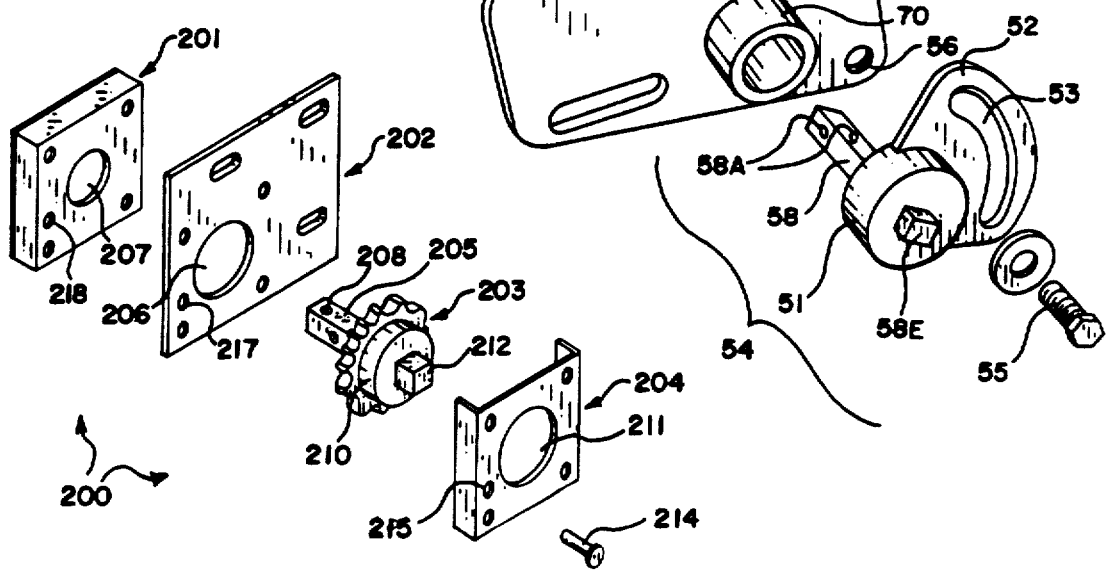
FIG. 8A is a fragmentary exploded perspective view of a preferred ratchet operated tension adjustment mechanism for the torque arm system.

An alternative tension adjustment system 200 is seen in FIG. 8A. Due to recent experiments we believe that adjustment system 200 is preferable to tension adjustment system 54 discussed above. System 200 comprises a square-profiled cap 201 that replaces collars 65A, a bracket 202 similar to bracket 40, a ratchet 203 that replaces cap 51, and a ratchet cover 204. Ratchet 203 comprises a key portion 205 that replaces key 58. Key 205 projects through orifices 206, 207 and orifice 208, and it receives a torsion spring leg 99A. Ratchet collar 210 passes through cover orifice 211, where drive head 212 is exposed. Like drive head 58E previously discussed, head 212 may be rotated, providing it is unlocked. Ratchet locking is effectuated by locking pin 214. When the locking pin 214 is installed, it penetrates aligned orifices 215, 217, and 218, and it seats between exposed teeth of the ratchet 203 to prevent ratchet rotation. To unlock the ratchet the pin 214 is simply removed. By rotating the unlocked ratchet, the torsion springs are thus tensioned with respect to the torque arm 60, and the cleaners are yieldably biased towards or away from the conveyor belt drum.

Figure 9:
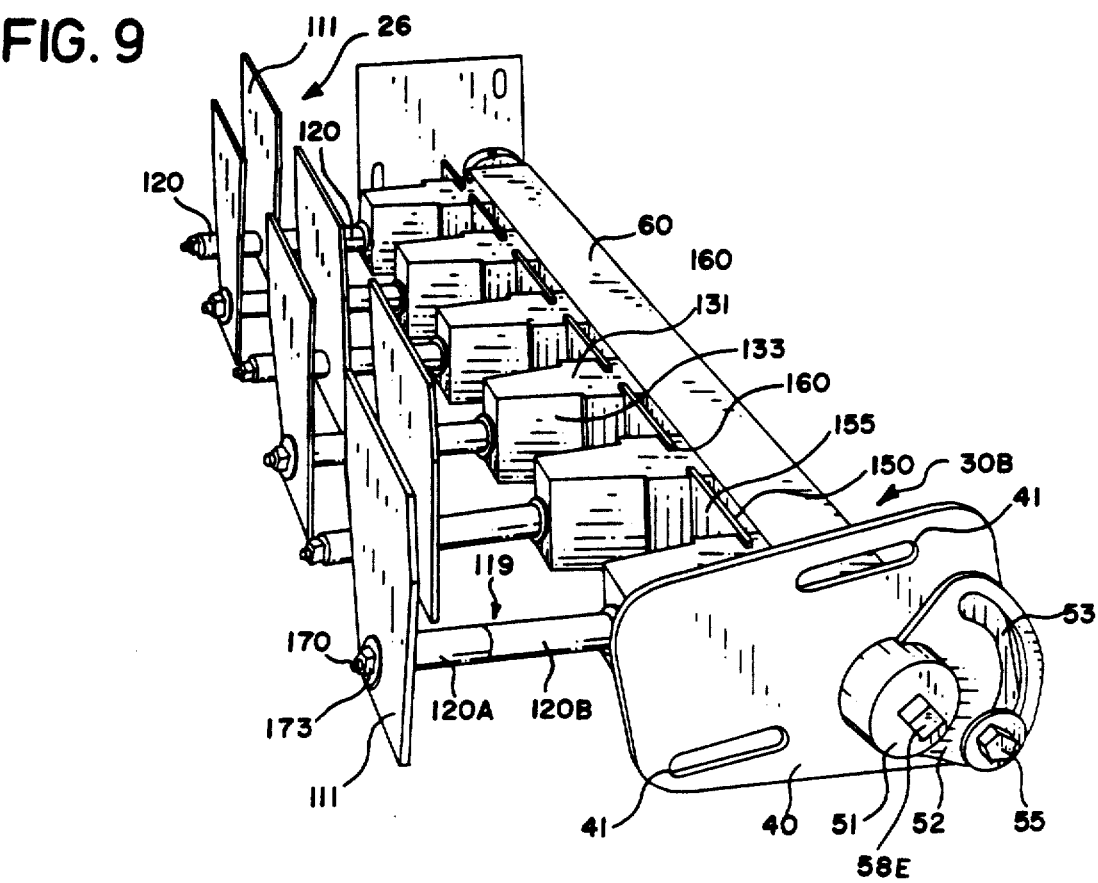
FIG. 9 is a fragmentary, isometric view of a preferred secondary scraper cleaner array.

In alternative embodiments substitute scrapers 26 (FIGS. 9, 10) and 27 (FIGS. 11, 12) may be employed, usually as secondary cleaners In each case a torsion system similar to system 50 is ideally employed Either tension adjustment system 54 or 200 discussed above may be used. The upright metal scrapers 26 illustrated in FIGS. 9 and 10 comprise generally planar, preferably metallic blades generally in the form of an inverted trapezoid. Each blade 111 is spaced apart from a rigid, generally cubicle base 130 by a shaft 119 anchored within base 130. Each base comprises a flat top and bottom 131, and opposed, inclined sides 133. Grooves 135 are cut into the base 130 perpendicularly to the top and bottom to facilitate mounting. The grooves allow insertion of the base into suitable, spaced apart slots 160 cut into channel 155 on the frame 30B (FIG. 9).

Figure 10:
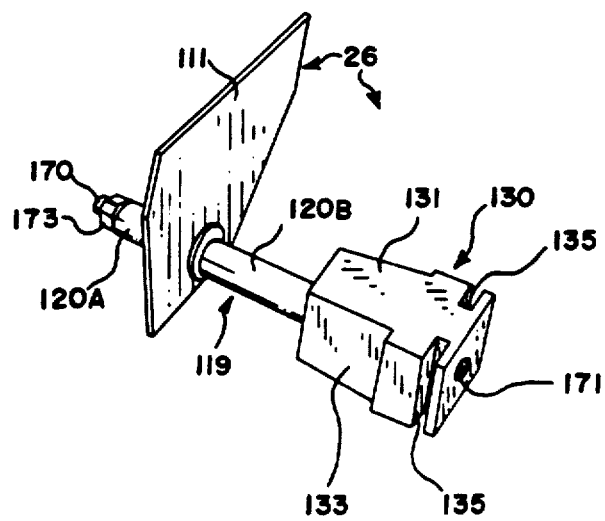
FIG. 10 is an isometric view of a preferred secondary cleaning scraper of FIG. 9.

A threaded rod 170 runs coaxially through the base 130 and shaft 119, extending between nut 173 and threaded base orifice 171. The shaft 119 comprises a pair of tubular spacers 120A and 120B that may be variably positioned to adjust blade spacing. In FIG. 9 both spacers 120A and 120B are disposed between base 130 and blade 111 for maximum spacing. In FIG. 10, the blade 111 has been moved closer to base 130 by relocating spacer 120A into abutment with nut 173 on the opposite side of blade 111. The position of spacers 120A and 120B may be varied to produce a user-configurable offset. Thus scrapers 26 are adjustable relative to the conveyor belt by repositioning sleeves on appropriate sides of the scraper blade 111.

Figure 11:
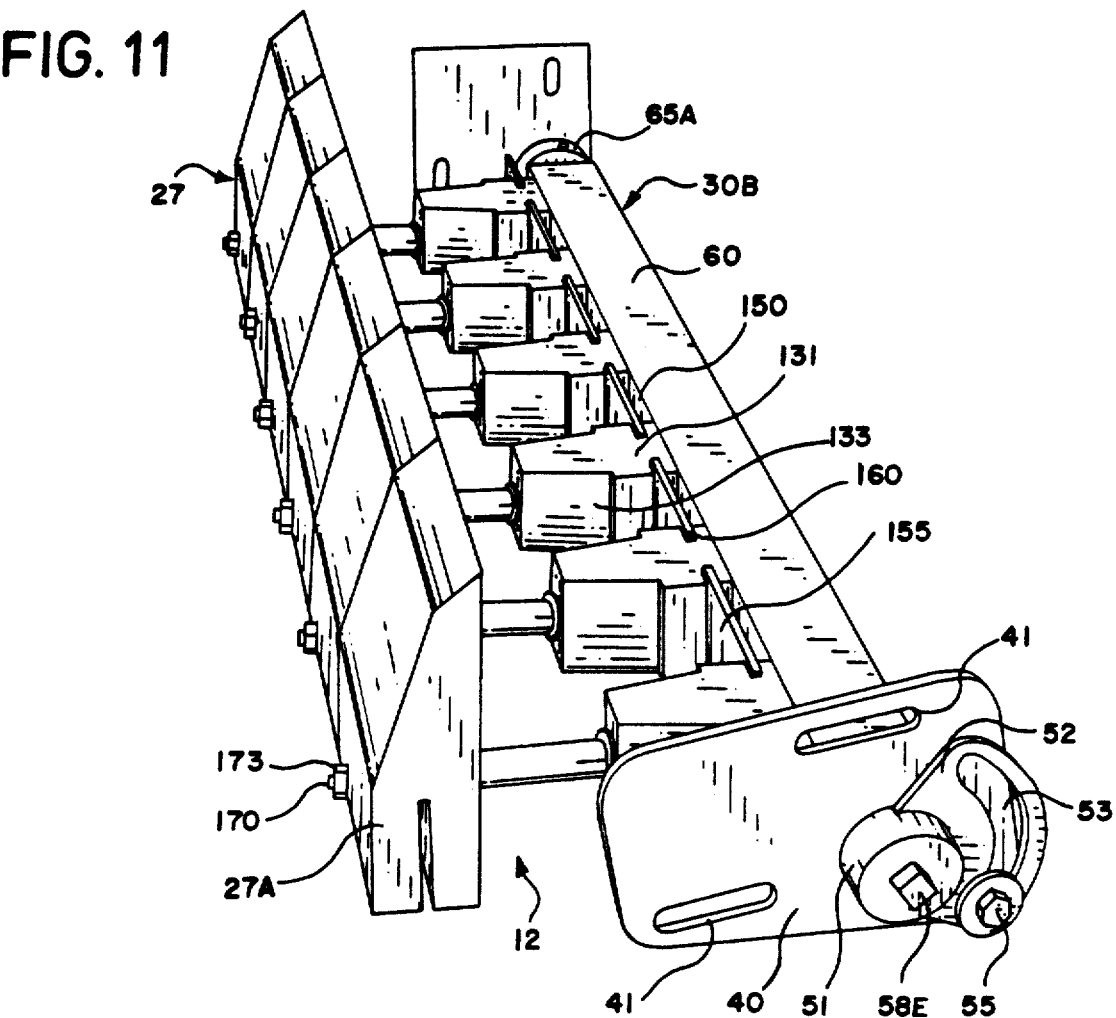
FIG. 11 is a fragmentary, isometric view of an alternative embodiment of a secondary scraper array employing multiple urethane secondary blades; and, FIG. 12 is an isometric view of a secondary scraper of the type employed in FIG. 11.
Figure 12:
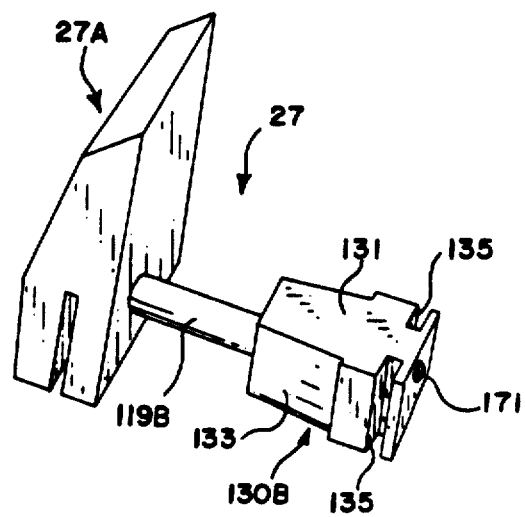

Another alternative scraper embodiment is seen in FIGS. 11 and 12. In these Figures reference numerals for parts that are identical with previously described parts have been employed for convenience. In this arrangement, a secondary scraper 27 is formed from the urethane blade of scraper 25 previously discussed. The blade portions 27A are spaced from bases 130B by shafts 119B. Bases 130B are identical to bases 130 previously discussed. Shafts 119B are similar to shafts 119 discussed earlier. As before with scrapers 26, scrapers 27 are attached to the frame 30B within suitable spaced apart channels 150 within bracket 155. Torsional effects as outlined above are achieved with this embodiment as well.

Operation

Thus the above described structure torsionally biases the various cleaning scrapers 25, 26 and 27 against a conveyor belt 15, and at the same time allows them to spring away from the belt 15 if severe resistance is encountered. The tension adjustment assembly 54, for example, is activated by loosening the retaining bolt 55 in the end bracket 40 and turning the drive head 58E that protrudes from the tensioner cap 51. As the key and thus the spring 99 are turned, the scrapers 25, 26 and 27 are moved towards or away from belt 15. As the head 58E is tensioned, the trunnion 70, the cap, and the torsion spring 99 within arm 60 are twisted. Spring 99 will thereby torsionally bias torque arm 60, and hence the scrapers will be tensioned against the conveyor. Once the desired tension is obtained, the retaining bolt 55 on the bracket 40 may be tightened, thereby locking the device 20 with the desired tension.

In order to provide sufficient spring action along the entire length of the cleaner 20, longer cleaner assemblies 20 require larger diameter springs 99. Once a certain length is reached, an alternative embodiment requires springs 99 disposed within both ends. A third embodiment incorporates two springs 99 of the necessary diameter in each end. While FIG. 8, for example, illustrates twin torsion springs, most applications will work adequately with a single spring.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A belt cleaner system for conveyors, said system comprising:
   a cleaning blade assembly for cleaning a conveyor belt, said blade assembly comprising an elongated torque arm and a plurality of scrapers mounted upon said torque arm for contacting said belt;
   bracket means for rotatably mounting said blade assembly relative to said conveyor;
   said torque arm having a polygonal cross section including opposed interior corners; and,
   internal torsion spring means for yieldably biasing said cleaning blade assembly against said conveyor belt, said torsion spring means having a first leg secured relative to said conveyor and an opposite, second leg received internally within said torque arm, said internal torsion spring means having at least one Z shaped spring, said first leg terminated to said bracket means and said second leg generally diagonally fitted between opposed interior corners of said torque arm.

2. A conveyor belt cleaner system as defined in claim 1 further comprising tensioning assembly means for variably tensioning said spring means, said tensioning assembly means comprising rotational means adapted to be mounted to said bracket means for relative rotation with respect thereto and a key projecting axially toward said torque arm from said rotational means for receiving said spring first leg.

3. A conveyor belt cleaner system as defined in claim 2 wherein said bracket means comprises a projecting tubular trunnion adapted to be coaxially, telescopingly received within said torque arm for enabling relative rotation of same, and wherein said key extends through said bracket means into said trunnion.

4. A conveyor belt cleaner system as defined in claim 2 including adjustable means for locking said tensioning assembly means.

5. A conveyor belt cleaner system as defined in claim 3 further comprising collar means coaxially, adjustably affixed about said trunnion for axially positioning said torque arm.

6. A conveyor belt cleaner system as defined in claim 5 wherein said torque arm comprises an integral, upwardly projecting flange for mounting said scrapers.

7. A conveyor belt cleaner system as defined in claim 6 wherein said, blades are made of urethane.

8. A conveyor belt cleaner system adapted to be mounted to belt-equipped conveyors, said system comprising:
   a cleaning assembly for contacting a conveyor belt, said assembly comprising an elongated torque arm and a plurality of scrapers projecting from said torque arm for frictional contact with said belt;
   bracket means for adjustably mounting said system adjacent a conveyor belt upon said conveyor; and,
   internal torsion spring means for yieldably biasing said cleaning assembly against said conveyor belt, said torsion spring means comprising at least one generally Z-shaped spring with a first leg fixed relative to said conveyor and a second leg secured to said cleaner assembly.

9. The conveyor belt cleaner system as defined in claim 8 wherein said first spring leg is secured to said bracket means, and said second spring leg is generally diagonally fitted within said torque arm.

10. The conveyor belt cleaner system as defined in claim 9 further comprising tensioning assembly means for variably tensioning said springs, said tensioning assembly means comprising a ratchet rotatably associated with said bracket means for lockable relative rotational adjustment with respect thereto, and a key emanating from said ratchet and extending through said bracket means for engagement with said first spring leg.

11. The conveyor belt cleaner system as defined in claim 9 further comprising a key coupled to said bracket means to which said first spring leg is secured, and a projecting tubular trunnion coaxially projecting from said key and telescopingly received within said torque arm.

12. The conveyor belt cleaner system as defined in claim 11 further comprising tensioning assembly means for variably tensioning said springs, said tensioning assembly means comprising:
   a cap associated with said bracket means for lockable relative rotational adjustment with respect thereto, wherein said key projects inwardly from said cap through said bracket means into said trunnion axially toward said torque arm;
   a follower slot associated with said cap; and,
   fastener means penetrating said slot for yieldably locking said cap and thus said key and said springs in a desired tension.

13. A conveyor belt cleaner system as defined in claim 12 further comprising collar means coaxially, adjustably affixed about said trunnion for controlling telescopic axial displacement of said torque arm.

14. A conveyor belt cleaner system as defined in claim 13 wherein said torque arm comprises an integral, upwardly projecting flange for mounting said scrapers.

15. A conveyor belt cleaner system for belt-equipped conveyors, said system comprising:

a cleaning assembly for contacting a conveyor belt, said assembly comprising an elongated, generally tubular torque arm of polygonal cross section having internal corners and a plurality of scrapers projecting from said torque arm;

bracket means for mounting said system upon said conveyor adjacent a conveyor belt to be cleaned; and, torsion spring means for yieldably biasing said cleaning assembly against said conveyor belt, said torsion spring means comprising at least one generally Z-shaped spring with a first leg terminated to said bracket means and a second spring leg generally diagonally fitted between diametrically opposed interior corners of said torque arm.

16. The conveyor belt cleaner system as defined in claim 15 further comprising tensioning adjustment means for variably tensioning said springs by rotating said first leg relative to said bracket means.

17. The conveyor belt cleaner system as defined in claim 16 wherein said tensioning adjustment means comprises a rotatable key coupled to said spring first leg for varying spring bias, a drive head adapted to be engaged by a wrench or the like, and means for locking said drive head.

* * * * *